US008467678B2

(12) United States Patent
Jenkins et al.

(10) Patent No.: US 8,467,678 B2
(45) Date of Patent: Jun. 18, 2013

(54) OSNR MODEL FOR OPTICAL ENGINEERING RULES USED IN A PLANNING TOOL

(75) Inventors: David W. Jenkins, North Aurora, IL (US); Julia Y. Larikova, Naperville, IL (US); Richard C. Younce, Yorkville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 791 days.

(21) Appl. No.: 12/544,571

(22) Filed: Aug. 20, 2009

(65) Prior Publication Data

US 2010/0322621 A1    Dec. 23, 2010

Related U.S. Application Data

(60) Provisional application No. 61/218,146, filed on Jun. 18, 2009.

(51) Int. Cl.
*H04B 10/08* (2006.01)

(52) U.S. Cl.
USPC .................................. 398/25; 398/26; 398/38

(58) Field of Classification Search
USPC .......................... 398/5, 25–26, 33, 38, 45, 50
See application file for complete search history.

(56) References Cited

U.S. PATENT DOCUMENTS

| 5,027,079 | A | 6/1991 | Desurvire et al. | |
|---|---|---|---|---|
| 6,834,109 | B1 | 12/2004 | Pare, Jr. et al. | |
| 6,952,529 | B1 * | 10/2005 | Mittal | 398/26 |
| 7,096,176 | B1 * | 8/2006 | Hess | 703/21 |
| 2003/0071985 | A1 | 4/2003 | Mori et al. | |
| 2004/0208576 | A1 | 10/2004 | Kinoshita et al. | |
| 2005/0041600 | A1 * | 2/2005 | Moffatt et al. | 370/254 |
| 2005/0123027 | A1 | 6/2005 | Cioffi et al. | |
| 2005/0175279 | A1 | 8/2005 | Nakajima et al. | |
| 2010/0142943 | A1 * | 6/2010 | Frankel et al. | 398/25 |
| 2010/0303473 | A1 * | 12/2010 | Alfiad et al. | 398/202 |

FOREIGN PATENT DOCUMENTS

WO    WO 01/47170 A2    6/2001

OTHER PUBLICATIONS

Non-published U.S. Appl. No. 11/354,705, filed Feb. 14, 2006.
Non-published U.S. Appl. No. 12/228,762, filed Aug. 15, 2008.
Non-published U.S. Appl. No. 12/228,776, filed Aug. 15, 2008.
Non-published U.S. Appl. No. 12/228,826, filed Aug. 15, 2008.
Non-published U.S. Appl. No. 12/228,763, filed Aug. 15, 2008.

(Continued)

*Primary Examiner* — Dzung Tran
(74) *Attorney, Agent, or Firm* — Hamilton, Brook, Smith & Reynolds, P.C.

(57) ABSTRACT

Increasing data rates in next-generation optical networks requires a change in the type of optical modulation used to encode optical signals carried by the optical networks. Different types of optical modulation incur different optical impairments, which may degrade the fidelity of the optical signals by reducing the optical signal-to-noise ratio (OSNR). A method or corresponding apparatus in an example embodiment of the present invention provides a planning tool for deploying an optical network in a manner based on the optical modulation that reduces the cost and complexity of the deployed network. In one embodiment, the disclosed planning tool may adjust a model of the optical network to be deployed by changing the topology and/or the number and/or type of optical network elements in response to optical impairments for a given optical modulation.

31 Claims, 5 Drawing Sheets

OTHER PUBLICATIONS

Momtahan, P., "The Case for Integrating Next-Generation Transport," (White Paper 74.1707E) Tellabs, (Rev. B: Feb. 2007).

Jenkins, D. W. and Scholtens, D. A., "Metro WDM Network Design & Evolution: Positioning for the Transition to Optical Meshes," (White Paper 74.1717E), Tellabs, (Rev. A: Oct. 2006).

Papakos, K., et al., "Optical Dynamic Core Networks: Design, Implementation and Engineering Considerations,"(White Paper 74.1825E) Tellabs, (Rev. A: Apr. 2007).

"BER vs. OSNR," *Circadiant Tech Brief*, (Tech Brief No. TB007), (Feb. 2003).

Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005).

çokrak, A.Cem and Altuncu, A., "Gain and Noise Figure Performance of Erbium Doped Fiber Amplifiers (EDFA)," *J. of Electrical & Electronics Engineering (Istanbul University)*, 4(2):1111-1122 (Jun. 15, 2004).

Notification of Transmittal of the International Search Report and the Written Opinion of the International Searching Authority for Int'l Application No. PCT/US2010/038095, Date of Mailing: Oct. 8, 2010.

The Notification Concerning Transmittal of International Preliminary Report on Patentability (Chapter 1 of the Patent Cooperation Treaty) for PCT/US2010/038095, "OSNR Model for Optical Engineering Rules Used in a Planning Tool", mailed Jan. 5, 2012 (10 pages).

* cited by examiner

OSNR MODEL FOR OPTICAL ENGINEERING RULES USED IN A PLANNING TOOL

RELATED APPLICATION

This application claims the benefit of U.S. Provisional Application No. 61/218,146, filed on Jun. 18, 2009, the entire teachings of which are incorporated herein by reference.

BACKGROUND

Deploying optical network elements (ONEs) to form an optical network is a difficult and expensive proposition: network providers need to correctly anticipate customer demand while building reliable networks as inexpensively as possible. In addition, network providers must also anticipate future technological developments, such as increased data rates, to simplify network upgrades. In part, network providers attempt to minimize cost and reduce network complexity by deploying ONEs, such as optical amplifiers and optical regenerators, in a way that minimizes the required power while ensuring signal fidelity.

In digital communication schemes, such as those employed in optical networks, signal fidelity may be characterized by a bit error rate (BER). Simply put, the BER is how frequently a receiver detects a bit incorrectly, that is, how often the receiver mistakes a representation of a logical '1' for a representation of a logical '0' or vice versa. Lower BERs are better; ideal (i.e., noise-free) receivers operate with BERs of zero (0), but shot noise and thermal noise at real receivers cause bit detection errors, raising BERs to measurable levels.

Currently, the target BER for optical networks is on the order of $10^{-12}$. To meet the target BER, network providers must guarantee a minimum optical signal-to-noise ratio (OSNR) at the receiver. The OSNR is usually defined as the ratio of the optical signal power $P_s$ to the optical noise power $P_n$ in a given channel bandwidth, $$OSNR = 10 \cdot \log_{10}\left(\frac{P_s}{P_n}\right). \qquad \text{Equation 1}$$

For digital signals, the detected power switches between a high level and a low level at a given data, or bit rate. In optical networks, the high and low levels can be defined in terms of a number of photons: for example, a 5 mW, 40 GHz optical signal in the Wavelength Division Multiplexing (WDM) C band may have a corresponding high level of about $10^6$ photons and a low level of 0 photons. In a shot-noise limited receiver, a signal of $10^6$ photons has an OSNR of 30 dB.

Because bits can be defined in terms of photons, the bit rate can be defined in terms of photons per second. As the bit rate increases, the number of photons per bit decreases given a constant optical power (i.e., spreading a constant number of photons per second over a larger number of bits per second reduces the photons per bit). The increased bit rate also leads to a decreased OSNR—the bandwidth increases, but the signal power remains constant, whereas the receiver noise power increases given a relatively constant noise power spectral density. Eventually, increasing the bit rate depresses the OSNR too far, pushing the BER above acceptable levels. In optical networks that use direct detection (i.e., networks that use on/off keying), the BER is related to the OSNR according to the relation $$BER \propto \frac{1}{2} \cdot \log_{10}(OSNR), \qquad \text{Relation 2}$$

where the OSNR is in linear units. As shown in Relation 2, maintaining a minimum BER requires maintaining a minimum OSNR. This, in turn, means that any increase in the bit rate should be offset by a corresponding increase in the OSNR to keep the BER at acceptable levels.

As light propagates through a network, however, it is absorbed and scattered, reducing the signal power and the OSNR. In addition, signals propagating through optical fiber suffer from loss due to four-wave mixing, chromatic dispersion, and polarization mode dispersion, further reducing the OSNR. As stated above, reductions in OSNR hamper the network's ability to support higher bit rates.

In long-haul and metro optical networks, optical amplification may boost the signal power to reliably detectable levels. Amplifiers add noise to the signal, however, despite increasing the signal strength. Even ideal amplifiers double the amount of noise present, which corresponds to a reduction of the OSNR by 3 dB.

Optical regeneration restores degraded signals to detectable status using optical-to-electrical-to-optical conversion. The degraded optical signals are converted to electrical signals, which can be processed in the electrical domain before being converted back to the optical domain. The resulting optical signals may have high enough OSNRs to be detectable throughout the network. Unfortunately, the transponders required to regenerate optical signals are complex and costly. Worse, their complexity and cost increase with the data rate and the number of channels, making regeneration an unattractive option for maintaining OSNR throughout an optical network.

SUMMARY

Embodiments of the present invention include methods of and tools for planning deployment of an optical network. First, a model of an optical network, which includes models representing a topology of optical network elements (ONEs), ONEs, and optical signals with optical modulation, is initialized. Next, optical signal-to-noise ratio (OSNR) penalties are computed as a function of the optical modulation and as a function of optical impairments associated with the model of the optical network. Then the model of the optical network is iteratively adjusted in an attempt to change the OSNR penalties in a manner known to enable detection of the optical signals to support communications between ONEs. Finally, indications of the model of the optical network are reported after a given number of iterations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
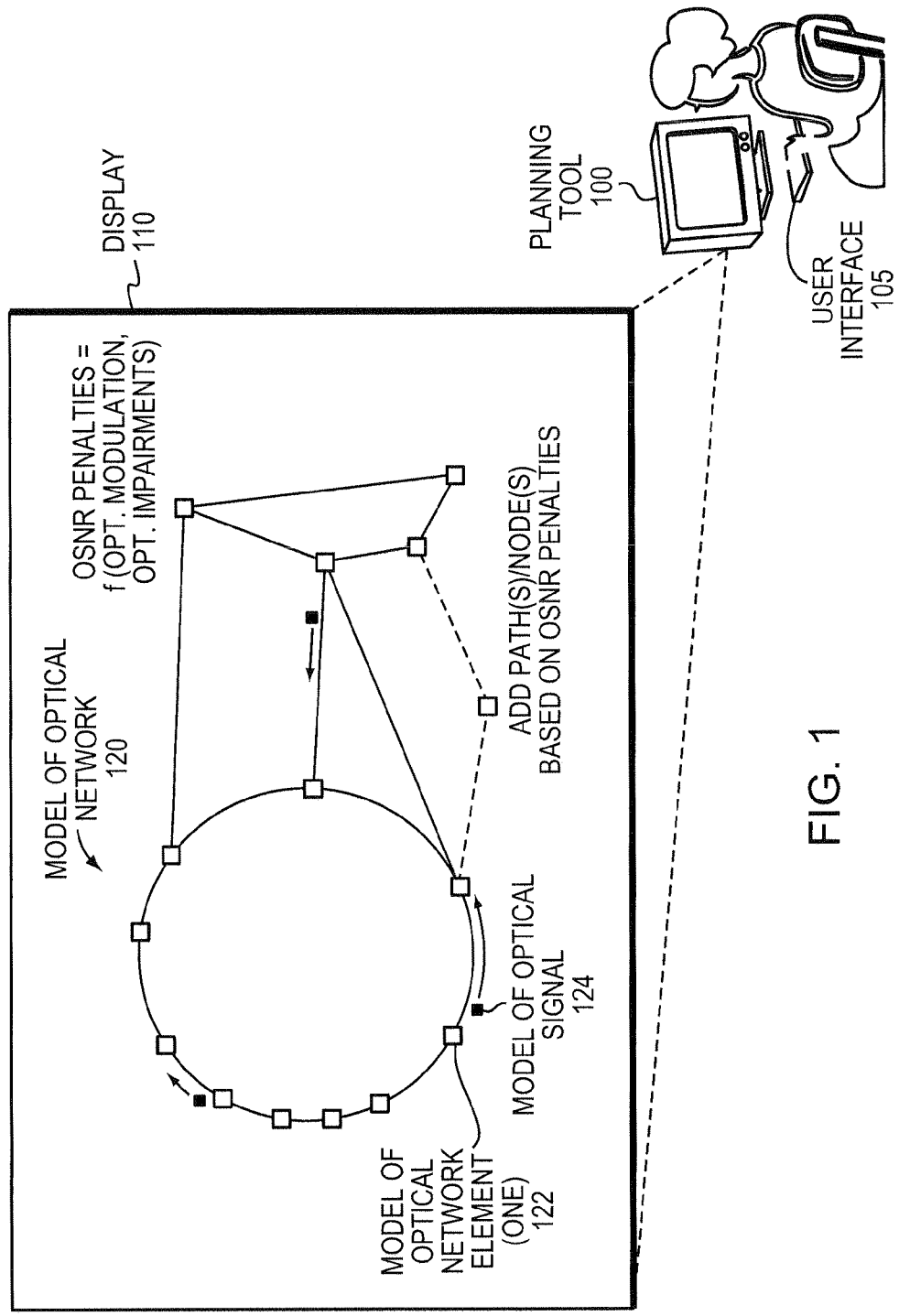
FIG. 1 is a schematic diagram that illustrates a user using an example embodiment of the present invention for planning deployment of optical network elements.

A description of example embodiments of the invention follows.

The disclosed planning tool provides a method and corresponding apparatus for determining the placement and configuration of optical network elements (ONEs) in optical networks to guarantee a minimum optical signal-to-noise ratio (OSNR) throughout the optical network, leading to a reduction in the number of transponders in the optical network. The example methods and apparatus disclosed herein may be used to plan deployment of an optical network that has sufficiently high signal strength to ensure reliable signal detection throughout the optical network.

One measure of signal strength is the OSNR, defined as the ratio of the optical signal power to the optical noise power in a given channel bandwidth. The OSNR may include effects of optical impairments, such as four-wave mixing, polarization mode dispersion (PMD), chromatic dispersion, self-phase modulation, cross-phase modulation, and other mechanisms that may affect transmission performance. To ensure reliable detection, the OSNR should be high enough to guarantee a threshold bit error rate (BER), which is typically $10^{-12}$ for optical networks. In general, larger OSNRs are better; OSNRs less than or equal to one (0 dB) indicate that the noise power is greater than or equal to the signal power. In embodiments of the disclosed planning tool, low OSNRs may indicate the need for optical regeneration to maintain sufficiently low BERs.

BER depends, in part, on the type of modulation used to encode the signals. At present, optical networks support communications using optical signals encoded with a variety different modulation schemes, the choice of which depends on the data rate, among other things. Networks that support communications at data rates of 10 Gb/s or less typically use on/off keying (OOK) schemes in which a bit is indicated by the presence or absence of light. In other words, in OOK, turning the signal on indicates a "1," and turning the signal off indicates a "0." Unfortunately, OOK is not suitable for communications at higher data rates because optical impairments make it difficult to reliably detect high-speed signals modulated using OOK techniques.

Fortunately, phase-shift keying (PSK) techniques developed for wireless communications can be used to increase the maximum data rate that can be reliably detected. With PSK modulation, the phase (e.g., 0°, 90°) of the received signal is compared to the phase of a reference signal to yield a bit value. Some PSK techniques, such as Quadrature PSK (QPSK), encode multiple bits per symbol to achieve higher data rates for a given bandwidth while maintaining a sufficiently low BER. (Even with phase encoding, however, encoding more bits per symbol requires transmitting more energy per signal to maintain a given OSNR.) PSK modulation is not suitable for most optical communications because it is difficult to distribute stable reference signals throughout optical networks.

Differential PSK (DPSK) techniques, however, do not need reference signals for accurate detection. In DPSK, the phase of the received symbol is compared to the phase of the previously received symbol to produce a difference in phase that corresponds to a bit value. For example, in differential QPSK (DQPSK), a 90° phase change between one symbol and the next may correspond to a binary value of "01," whereas a 270° phase change may correspond to a binary value of "10." Even though DQPSK is relatively well-known for wireless communications, it has not yet been adopted for widespread use in optical communications. Thus, few people have contemplated problems associated with using DQPSK for optical communications, including impairments due to transmitting DQPSK signals over optical networks.

Because DQPSK uses phase, not intensity, to encode multiple bits per symbol, DQPSK modulation may lead to more severe optical impairments due to four-wave mixing, self-phase modulation, and cross-phase modulation. (This is because DQPSK signals are at relatively constant power.) On the other hand, optical impairments due to PMD tend to be lower for DQPSK modulation than for OOK modulation. As PMD usually impairs transmission more than four-wave mixing, self-phase modulation, or cross-phase modulation, switching from OOK modulation to DQPSK modulation may reduce the aggregate impairment level, decreasing the BER for a given modulation rate at the expense of more complicated modulation and detection.

As lower aggregate impairments lead to better signal fidelity, next-generation optical networks, such as networks that support communications at 40 or 100 GB/s, may use DQPSK or similar modulation instead of OOK. Because DQPSK modulation incurs different optical impairments than OOK modulation, however, planning networks that use DQPSK modulation requires considering factors not considered when planning networks that use OOK modulation. Planning becomes even more complicated for networks that support communication using both DQPSK and OOK modulation, as differently modulated signals interact with each other to produce crosstalk and other optical impairments.

FIG. 1 is a schematic diagram that illustrates an example planning tool 100 according to embodiments of the present invention. The planning tool 100 may be used to plan the deployment of an optical network characterized by a network topology and ONEs distributed throughout the topology. The optical network may be organized in various topologies, including, but not limited to, ring, linear, and mesh topologies. ONEs may include, but are not limited to, optical amplifiers, optical regenerators, reconfigurable optical add/drop multiplexers (ROADMs), and wavelength-selective switches. ONEs may be located at or between nodes in the network depending on the network topology and the type of ONE. For example, ROADMs are typically located at network nodes to add and/or drop signals, whereas amplifiers may be situated at or between network nodes to boost signal strength.

The planning tool 100 accounts for optical modulation type by calculating optical impairments based on the selected type of modulation. For OOK, optical impairments due to PMD may dominate; for DQPSK, on the other hand, optical impairments due to self-phase modulation may be larger than impairments due to PMD. The planning tool 100 converts the calculated optical impairments to OSNR penalties associated with a particular link or device. For example, PMD in a 100 km long optical fiber may yield an OSNR penalty of 3 dB for OOK modulation but only a 0.5 dB penalty for DQPSK modulation. Similarly, the frequency-dependent phase response of a filter in a ROADM may incur a 1 dB penalty for DQPSK signals, but no penalty at all for OOK signals.

To use the planning tool 100, a user begins by initializing a model of an optical network 120 using a user interface 105, such as a keyboard or a mouse, and a display 110. The model of the optical network 120 includes information about network topology, such as the number and locations of nodes, fiber types and lengths; models of ONEs, such as optical amplifiers, optical regenerators, transponders, ROADMs; and models of optical signals 124, including models of the optical modulation. The various models 120, 122, and 124 may include noise figures, losses, and other parameters relevant to calculating OSNR.

After the planning tool 100 initializes the model of the optical network 120, it computes OSNR penalties throughout the model of the optical network 120 by calculating the effect of each optical component (including the optical fiber) on transmitted optical signals. Effects may be divided into: loss, which is the reduction of optical intensity; other OSNR effects, such as noise figure reduction due to amplification; and effects that do not cause OSNR penalties but should remain within a given range to ensure proper network operation. These latter effects can be tracked within any given network design and limited to the specified ranges.

Amplifiers often have the most dramatic effects on OSNR because they reduce the OSNR despite increasing signal strength. Other effects on OSNR include optical impairments due to chromatic dispersion and PMD, which are modeled as "optical penalties" or degradations to OSNR. Penalties include, but are not limited to: first-order PMD (also called differential group delay); second-order PMD; self-phase modulation; cross-phase modulation; and crosstalk between channels, or four-wave mixing. These penalties depend on the bit rate of the signal (e.g., 10 Gb/s, 40 Gb/s) and the optical modulation.

If the OSNR penalties are such that the OSNR for an optical signal falls below a threshold for detectability, the planning tool adjusts the model 120, then recomputes the OSNR penalties. For instance, the planning tool 100 may replace a model of a noisy optical amplifier with a model of a low-noise amplifier to boost the OSNR; alternatively, it may add models of optical regenerators at models of nodes where the model signal 124 is below the detectability threshold. The planning tool 100 may also remove models of amplifiers and models of regenerators where the OSNR is above the OSNR threshold to reduce network cost. In addition, the planning tool 100 may add models of regenerating lasers and receivers (transponders) between models of transmission end points (nodes) in the model 120.

The planning tool 100 continues to adjust the model of the optical network 120 in an attempt to ensure that all the signals can be detected while minimizing the cost of deploying the network. The planning tool 100 may consider factors including loss in each span, expected traffic patterns, and proposed regeneration locations along paths of expected traffic to determine locations for placing models of ONES 122 in the model of the optical network 120.

The cost of a network may be determined as a function of the cost of network elements (e.g., regenerators and amplifiers) for maintaining signal strength in the network. Cost can include installation time or expense, maintenance time or expense, signal fidelity, network redundancy, link availability, etc. In general, cost varies with the number and type of ONEs; usually, there is a trade-off between a large number of less expensive ONEs and a small number of more expensive ONEs. Further details on OSNR penalties and cost calculations for optical networks can be found in U.S. application Ser. No. 12/228,763, U.S. application Ser. No. 12/387,023, and U.S. application Ser. No. 12/436,397, all of which are incorporated herein by reference in their entireties.

Figure 2:
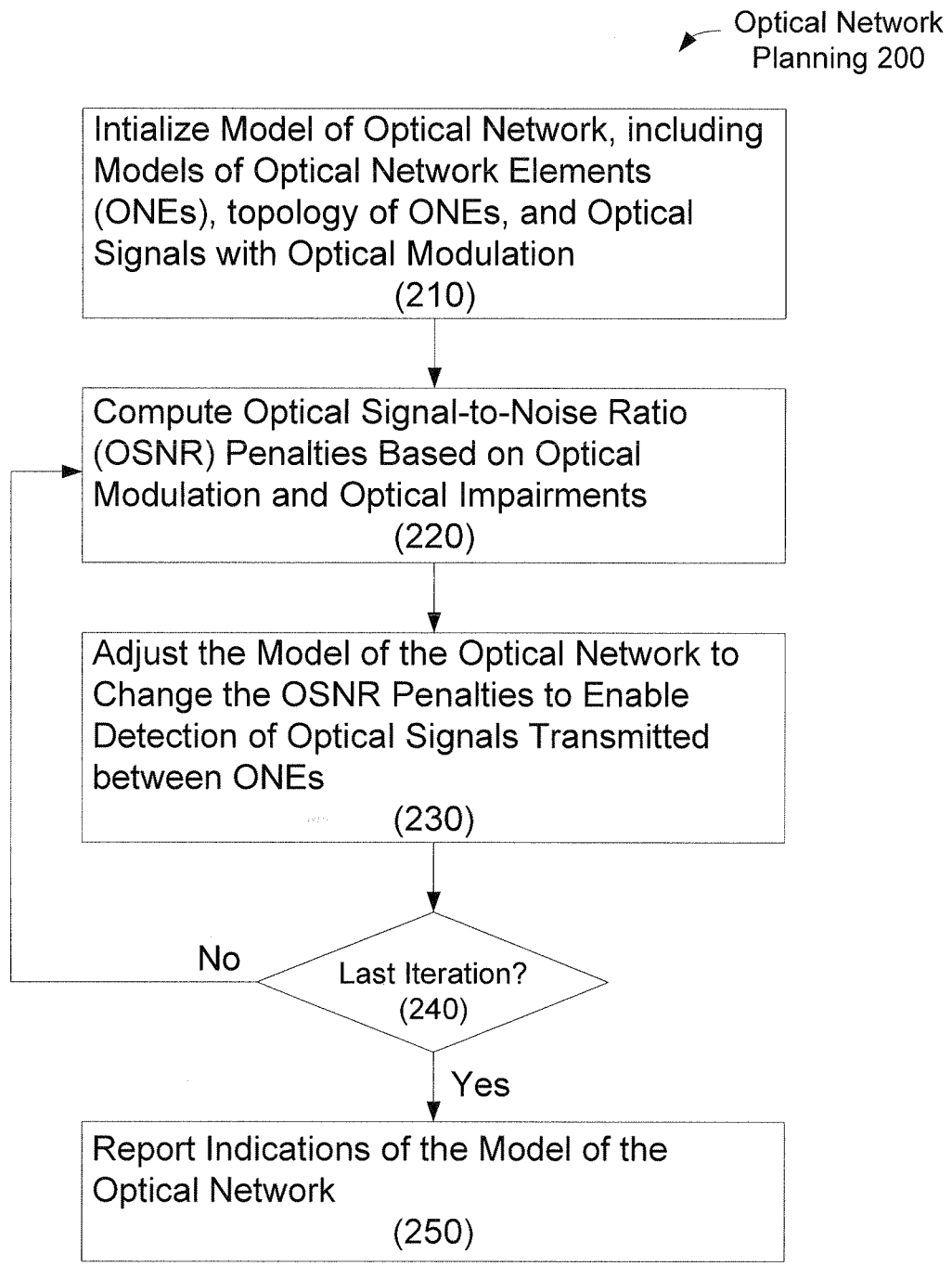
FIG. 2 is a flow diagram of planning an optical network according to an example embodiment of the present invention.

FIG. 2 is a flow diagram that illustrates optical network planning 200 according to embodiments of the present invention. Planning begins with the initialization (210) of a model of an optical network, including models of ONEs, a model of the network topology, and models of optical signals with optical modulation. Planning continues with the computation (220) of OSNR penalties, which are based on both the type of optical modulation and optical impairments associated with the models of the ONEs and the model of the network topology. The optical impairments may also depend on the optical modulation as described above. Next, planning proceeds with iterative adjustments (230) to the model of the optical network in an attempt to change (i.e., reduce) the computed OSNR penalties (220) to enable detection of optical signals using known detection techniques. This may mean adjusting the model of the optical network so that the models of the optical signals are above a certain OSNR threshold at the nodes in the model of the optical network. After the last iteration (240), indications of the model of the network are reported (250) to the user.

Figure 3:
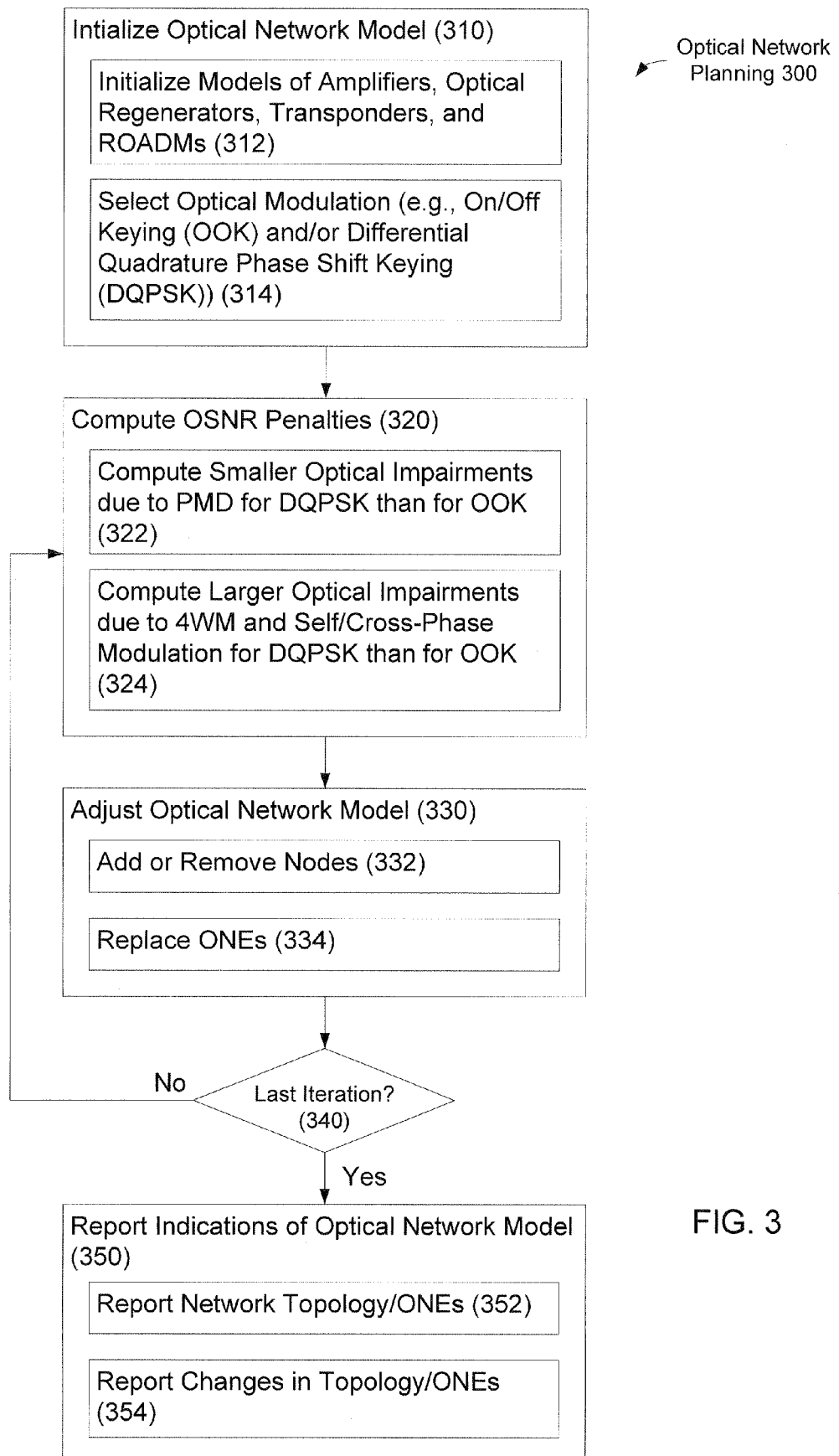
FIG. 3 is a flow diagram of planning an optical network according to an alternative example embodiment of the present invention.

FIG. 3 is a flow diagram that shows optical network planning 300 according to an alternative example embodiment of the present invention. Planning starts with initialization (310) of a model of optical network. In this alternative example embodiment, initialization of the model of the optical network (310) includes initialization of models of amplifiers, optical regenerators, transponders, and ROADMs (312). These sub-models may incorporate noise figure, loss, phase response, and other information relevant to OSNR penalty computation. Initialization (310) also includes selection of one or more types of optical modulation (314), such as OOK and/or DQPSK. Different types of optical modulation may be selected for modeling in different parts of the model of the optical network.

Planning progresses with computation of OSNR penalties (320) at locations in the model of the optical network. The OSNR penalties are functions of optical impairments associated with various sub-models within the model of the optical network. The optical impairments depend, in turn, on the particular optical modulation selected during initialization (314). For example, impairments due to PMD are lower for DQPSK than for OOK (322); in contrast, impairments due to four-wave mixing (4 WM), self-phase modulation, and cross-phase modulation may be lower for OOK than for DQPSK (324).

Once the OSNR penalties are computed (320), the model of the optical network can be adjusted to change the OSNR penalties. Adjustments include adding, removing, and repositioning nodes (332) to alter the topology of the model of the optical network. In addition, models of ONEs may be added, removed, or replaced (334) with other ONEs. For example, a model of an optical amplifier may be replaced with a model of an optical regenerator to reduce excessive OSNR penalties. That is, models of regenerating lasers and receivers (transponders) may be added between models of transmission end points (nodes) in the model of the optical network. If the OSNR penalties are small enough that the OSNR is well above the threshold, then models of amplifiers may be removed or replaced with models of noisier amplifiers; similarly, models of optical regenerators may be removed or replaced with models of amplifiers.

Planning (300) may determine an optimum deployment pattern using any suitable method. For example, planning (300) may rely on brute-force calculations, i.e., calculation of all possible arrangements of the model of the optical network followed by selection of the optimum arrangement. The brute-force approach works with small numbers of arrangements, but may require too many iterations and/or too much memory for large numbers of arrangements. Alternatively, the planning tool may optimize by minimizing (or maximizing) a figure of merit with a least-squares estimation technique, such as the singular value decomposition method or the Levenberg-Marquardt method. The planning tool may also perform a search in a multidimensional space using the downhill simplex (Nelder-Mead) method, Powell's method, simulated annealing, genetic methods, or any other suitable method(s).

Planning (300) continues with iterations through the loop (320, 330, 340) until the number of iterations equals a given number. At most, the number of iterations should be no more than the total number of possible arrangements of the model of the optical network. Alternative embodiments may iterate through the loop until the OSNR penalties converge or until a given iteration time elapses. Still other embodiments may stop iterating in response to user interruption, possibly in the form of a user-determined number of iterations. The planning tool may also iterate conditionally: for example, the planning tool may iterate through either a fixed number of iterations or convergence of parameters associated with the model of the optical network, whichever occurs first. The foregoing examples are generally covered by the term "number of iterations" herein.

After the last iteration, planning (300) terminates with reporting indications (350) of the model of the optical network to the user. Reporting indications (350) may include reporting the final models of ONEs and network topology (342), changes in the model of the optical network (344), or other parameters associated with the model of the optical network. Indications may include visual displays or renderings, such as screen displays and printouts, auditory displays, or electronically encoded representations, such as those stored on computer-readable media.

Figure 4:
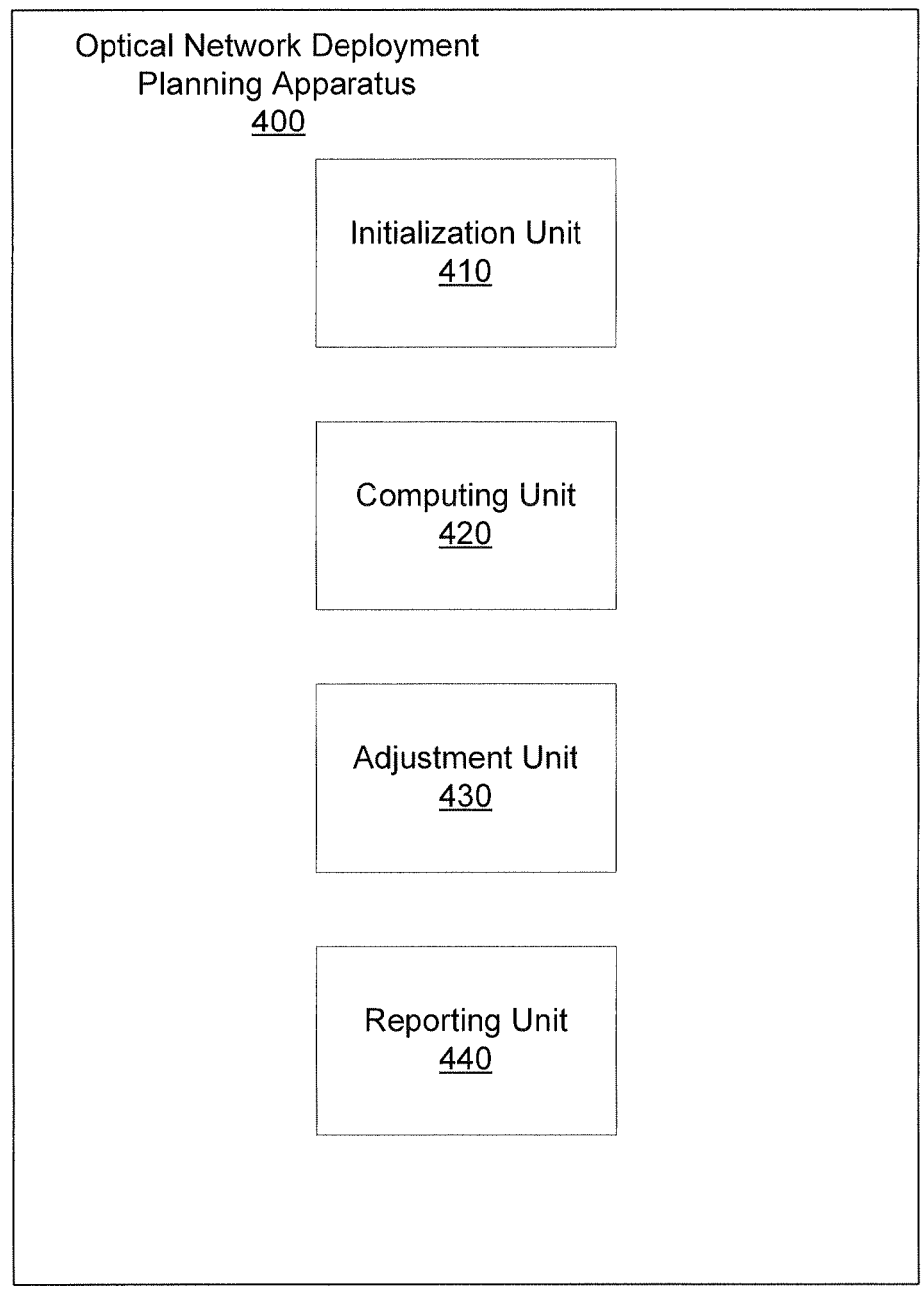
FIGS. 4 and 5 are block diagrams of example embodiments of an optical network deployment planning apparatus according to principles of the present invention.

FIG. 4 is a block diagram that illustrates an example embodiment of an ONE deployment planning apparatus 400 according to the disclosed planning tool. The apparatus 400 can be used to plan the deployment of an optical network by modeling the optical network and its performance for different arrangements. The apparatus 400 includes an initialization unit 410, computing unit 420, adjustment unit 430, and reporting unit 440. The initialization unit 410 initializes a model of the optical network being planned, including models that represent ONEs, ONE topology, and optical modulation/signals. The computing unit 420 calculates OSNR penalties for the initialized model as a function of optical impairments (e.g., insertion loss, propagation loss, amplifier noise figure) and the optical modulation (e.g., OOK and DQPSK).

The adjustment unit 430 iteratively adjusts the model of the optical network to reduce the calculated OSNR penalties such that they fall below the threshold for signal detection. The adjustment unit 430 may replace models of ONEs with other models of ONEs or change the model topology. Once the adjustment unit 430 finishes with one iteration, it forwards the resulting network model to the computing unit 420 for recalculation of the OSNR penalties. If the adjustment unit 430 determines that no further iterations are desired, it forwards the final model to the reporting unit 440, which outputs an corresponding indication of the final model to a user.

Figure 5:
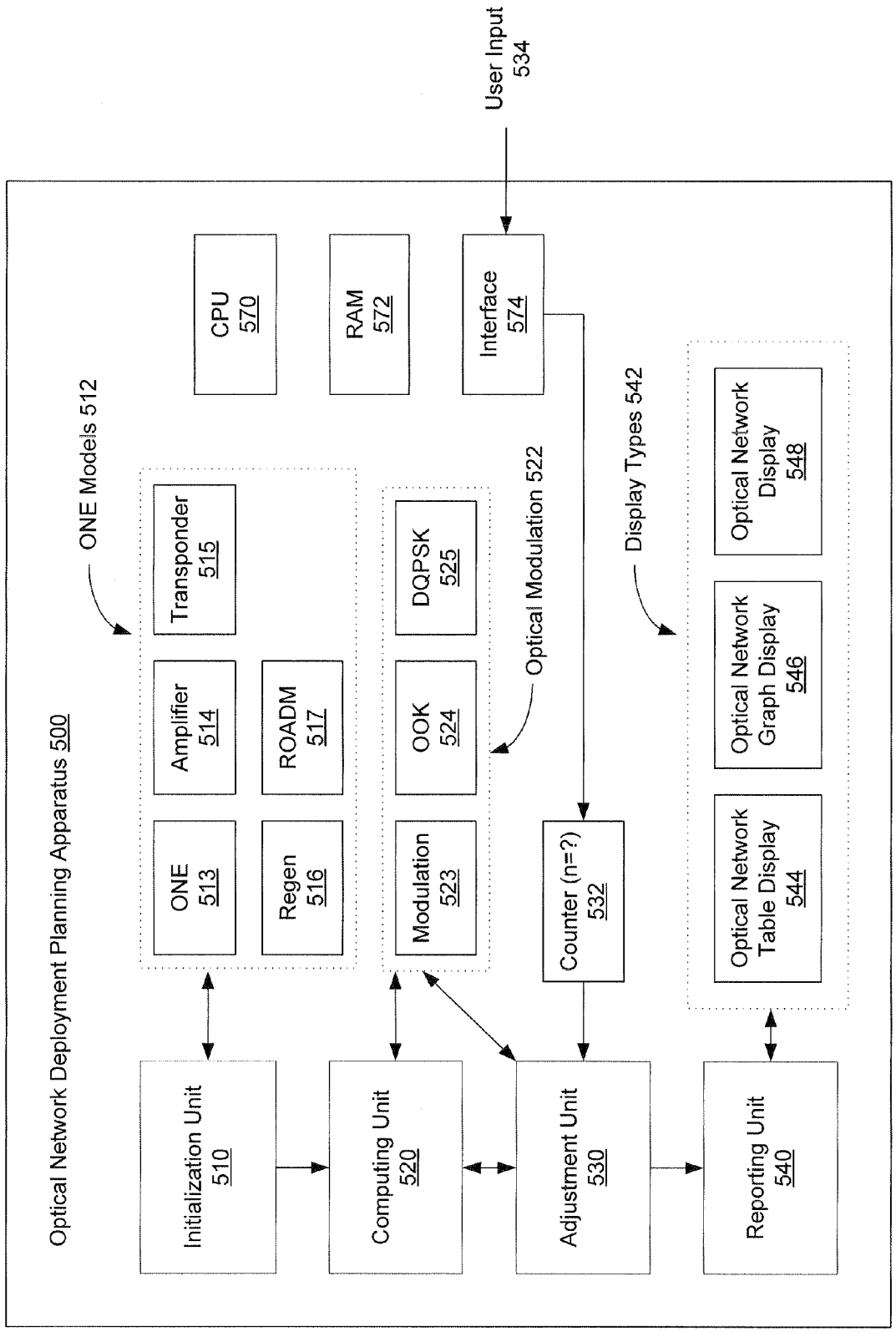

FIG. 5 is a block diagram that illustrates a second example embodiment of an optical network deployment planning apparatus 500 according to the disclosed planning tool. Like the example shown in FIG. 4, the apparatus 500 includes an initialization unit 510, a computing unit 520, an adjustment unit 530, and a reporting unit 540. These units 510, 520, 530, 540 may be managed by a central processing unit (CPU) 570 that operates in conjunction with a random access memory (RAM) 572.

In the apparatus 500, the initialization unit 510 initializes a model of an optical network using a group of ONE models 512 that includes models of generic ONEs 513, such as optical splitter/combiners, WDMs, optical network terminals, and optical line terminals. The group of ONE models 912 also includes models of transponders 515, optical regenerators 516, ROADMs 517, and optical amplifiers 514, where the models of amplifiers 514 include information about the amplifier operating settings, such as gain and noise figure. The model of the optical network includes a model of ONE topology, which may be ring, mesh, linear, hybrid, or any other suitable topology.

The model of the optical network also includes a model of the optical modulation(s) used to encode signals transported by the network. The initialization unit 510 selects one or more models of optical modulation 523 from among a group of models 522. Example models include models of OOK 524 and DQPSK 525. Different models of optical modulation may be used for different parts of the optical network. For example, DQPSK 525 may be used to encode long-haul traffic, and OOK 524 may be used to encode metro traffic, or vice versa.

Once the initialization unit 510 completes initializing the model of the optical network, the computing unit 520 calculates OSNR penalties throughout the network. The computing unit 520 may refer to the operating parameters of the ONEs, including gain settings of the models of optical amplifiers 516, during calculation of the OSNR penalties. The computing unit 520 also uses information about the selected optical modulation to determine compute the OSNR penalties as described above.

After the computing unit 520 completes an initial OSNR penalty calculation, the adjustment unit 530 determines whether or not to adjust the model of the optical network. If the OSNR penalties fall within accepted limits, the adjustment unit 530 may determine that no adjustments are necessary. Otherwise, the adjustment unit 530 may adjust the selection and/or distribution of ONE models 512, optical modulation models 522, and network topology. After finishing its adjustments, the adjustment unit 530 forwards the model of the optical network to the computing unit 520 for recalculation of the OSNR margin table.

The adjustment unit 530 may repeat this cycle for a fixed number of iterations, where a counter 532 tracks the total number of iterations and the current iteration number. The number of iterations may be preset, fixed by the user, or equal to the total number of possible arrangements of the model of the optical network. Alternatively, the adjustment unit 530 may halt the adjustment/recomputation loop in response to a user input 534 transmitted through an interface 574. The adjustment unit 530 may also halt the adjustment/recomputation loop when the OSNR penalties converge. Conditional halts may also be used to terminate the adjustment/recomputation loop.

Once the adjustment/recomputation loop halts, the adjustment unit 530 forwards indications of the final model to the reporting unit 540, which reports the indication(s) via at least one of a variety of different display types 542 to a user. For example, the reporting unit 540 may report indications of the final selection of the ONE models, including the ONE location, type, and differences between the models as initialized and the models as reported. In some embodiments, the reporting unit 540 may also report an ONE change display 548 indicating any or all of the number, location, and changes in ONEs within the modeled optical network. The reporting unit 540 may also report the OSNR penalties in tabular form 544, graphical form 546, or both.

It should be understood that the example flow diagrams of FIGS. 2 and 3 can be readily converted to modules, subsystems, or systems that operate in a similar manner as set forth above. For example, the example embodiments may include an initialization module, computing module, and reporting module.

It should be further understood that the examples presented herein can include more or fewer components, be partitioned into subunits, or be implemented in different combinations. Moreover, the flow diagrams herein may be implemented in hardware, firmware, or software. If implemented in software, the software may be written in any suitable software language. The software may be embodied on any form of computer readable medium, such Random Access Memory (RAM), Read-Only Memory (ROM), or magnetic or optical disk, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims.

What is claimed is:

1. A method of planning deployment of an optical network, the method comprising:
   initializing a model of an optical network including models representing a topology of optical network elements (ONEs), ONEs, and optical signals with optical modulation;
   computing optical signal-to-noise ratio (OSNR) penalties as a function of the optical modulation and as a function of optical impairments associated with the model of the optical network;
   iteratively adjusting the model of the optical network in an attempt to change the OSNR penalties in a manner known to enable detection of the optical signals to support communications between ONEs; and
   reporting indications of the model of the optical network after a given number of iterations.

2. The method of claim 1 wherein initializing the model of the optical network includes initializing models of any of optical amplifiers, transponders, optical regenerators, and reconfigurable optical add/drop multiplexers.

3. The method of claim 1 wherein initializing the model of the optical network includes selecting the optical modulation to be on/off keying.

4. The method of claim 1 wherein initializing the model of the optical network includes selecting the optical modulation to be differential quadrature phase-shift keying.

5. The method of claim 1 wherein initializing the model of the optical network includes selecting different types of optical modulation for use on the optical network.

6. The method of claim 1 wherein computing OSNR penalties includes calculating optical impairments due to any of chromatic dispersion, polarization mode dispersion, four-wave mixing, self-phase modulation, and cross-phase modulation.

7. The method of claim 6 wherein computing OSNR penalties includes calculating lower optical impairments due to polarization mode dispersion for differential quadrature phase-shift keying than for on/off keying.

8. The method of claim 6 wherein computing OSNR penalties includes calculating higher optical impairments due to four-wave mixing, self-phase modulation, and cross-phase modulation for differential quadrature phase-shift keying than for on/off keying.

9. The method of claim 1 wherein iteratively adjusting the model of the optical network includes adding regenerating lasers and receivers between transmission end points.

10. The method of claim 1 wherein iteratively adjusting the model of the optical network includes replacing models of a first type of ONE with models of a second type of ONE.

11. The method of claim 1 wherein iteratively adjusting the model of the optical network includes adding or removing nodes from the topology of ONEs.

12. The method of claim 1 wherein iteratively adjusting the model of the optical network includes attempting to ensure that the OSNR penalties remain below a threshold throughout the model of the optical network.

13. The method of claim 1 wherein reporting indications of the model of the optical network includes reporting indications of the topology of ONEs and indications of the ONEs.

14. The method of claim 1 wherein reporting indications of the model of the optical network includes reporting indications of changes in the topology of ONEs and indications of changes in the ONEs.

15. The method of claim 1 wherein the given number of iterations is selected from: a fixed number, a convergence of at least a subset of the OSNR penalties, a number performed in a period of time, and a user-determined number.

16. An apparatus to plan deployment of an optical network, the apparatus comprising:
   an initialization unit configured to initialize a model of an optical network including models representing a topology of optical network elements (ONEs), ONEs, and optical signals with optical modulation;
   a computing unit configured to compute optical signal-to-noise ratio (OSNR) penalties as a function of the optical modulation and as a function of optical impairments associated with the model of the optical network;
   an adjustment unit configured to iteratively adjust the model of the optical network in an attempt to change the OSNR penalties in a manner known to enable detection of the optical signals to support communications between ONEs; and
   a reporting unit configured to report indications of the model of the optical network after a given number of iterations.

17. The apparatus of claim 16, wherein the initialization unit is further configured to initialize models of any of optical amplifiers, transponders, optical regenerators, and reconfigurable optical add/drop multiplexers.

18. The apparatus of claim 16 wherein the initialization unit is further configured to select the optical modulation to be on/off keying.

19. The apparatus of claim 16 wherein the initialization unit is further configured to select the optical modulation to be differential quadrature phase-shift keying.

20. The apparatus of claim 16 wherein the initialization unit is further configured to select different types of optical modulation for use on the optical network.

21. The apparatus of claim 16 wherein the computing unit is further configured to calculate optical impairments due to any of chromatic dispersion, polarization mode dispersion, four-wave mixing, self-phase modulation, and cross-phase modulation.

22. The apparatus of claim 21 wherein the computing unit is further configured to calculate lower optical impairments due to polarization mode dispersion for differential quadrature phase-shift keying than for on/off keying.

23. The apparatus of claim 21 wherein the computing unit is further configured to calculate higher optical impairments due to four-wave mixing, self-phase modulation, and cross-phase modulation for differential quadrature phase-shift keying than for on/off keying.

24. The apparatus of claim 16 wherein the adjustment unit is further configured to add regenerating lasers and receivers between transmission end points of the optical network.

25. The apparatus of claim 16 wherein the adjustment unit is further configured to replace models of a first type of ONE with models of a second type of ONE.

26. The apparatus of claim 16 wherein the adjustment unit is further configured to add or remove nodes from the topology of ONEs.

27. The apparatus of claim 16 wherein the adjustment unit is further configured to attempt to ensure that the OSNR penalties remain below a threshold throughout the model of the optical network.

28. The apparatus of claim 16 wherein the reporting unit is further configured to report indications of the topology of ONEs and indications of the ONEs.

29. The apparatus of claim 16 wherein the reporting unit is further configured to report indications of changes in the topology of ONEs and indications of changes in the ONEs.

30. The apparatus of claim 16 wherein the given number of iterations is selected from: a fixed number, a convergence of at least a subset of the OSNR penalties, a number performed in a period of time, and a user-determined number.

31. A computer program product including a computer-readable medium having a computer-readable program, the computer-readable program, when executed by a computer, causes the computer to:

initialize a model of an optical network including models representing a topology of optical network elements (ONEs), ONEs, and optical signals with optical modulation;

compute optical signal-to-noise ratio (OSNR) penalties as a function of the optical modulation and as a function of optical impairments associated with the model of the optical network;

iteratively adjust the model of the optical network in an attempt to change the OSNR penalties in a manner known to enable detection of the optical signals to support communications between ONEs; and report indications of the model of the optical network after a given number of iterations.

* * * * *